US005812536A

United States Patent [19]

Manduely

[11] Patent Number: 5,812,536

[45] Date of Patent: Sep. 22, 1998

[54] SECURE ACCOUNTING SYSTEM EMPLOYING RF COMMUNICATIONS FOR ENHANCED SECURITY AND FUNCTIONALITY

[75] Inventor: Flavio M. Manduely, Woodbury, Conn.

[73] Assignee: Pitney Bowes Inc., Stamford, Conn.

[21] Appl. No.: 498,309

[22] Filed: Jul. 5, 1995

[51] Int. Cl.[6] .............. H04L 5/14

[52] U.S. Cl. .............. 370/282; 705/403; 705/404; 340/825.35

[58] Field of Search .............. 364/514 R, 464.02, 364/464.03, 406, 464.01, 464.04, 464.21, 464.2; 370/60, 422, 261, 282; 379/202, 201, 231; 340/825.31, 825.34, 825.35; 705/401, 403, 404, 409

[56] References Cited

U.S. PATENT DOCUMENTS

| | | | |
|---|---|---|---|
| 1,192,829 | 7/1916 | Harriman . | |
| 3,978,457 | 8/1976 | Check et al. | 340/172.5 |
| 4,138,735 | 2/1979 | Allocca et al. | 364/464 |
| 4,168,533 | 9/1979 | Schwartz | 364/900 |
| 4,253,158 | 2/1981 | McFiggans | 364/900 |
| 4,268,817 | 5/1981 | Simjian | 340/825.35 |
| 4,287,825 | 9/1981 | Eckert, Jr. et al. | 101/91 |
| 4,301,507 | 11/1981 | Soderberg et al. | 364/464 |
| 4,430,716 | 2/1984 | Dlugos et al. | 364/464.03 |
| 4,493,252 | 1/1985 | Clark | 101/71 |
| 4,725,718 | 2/1988 | Sansone et al. | 235/495 |
| 4,752,950 | 6/1988 | Carpentier | 379/106 |
| 4,757,537 | 7/1988 | Edelmann | 380/23 |
| 4,775,246 | 10/1988 | Edelmann | 380/23 |
| 4,780,835 | 10/1988 | Sievel et al. | 340/825.35 |
| 4,796,193 | 1/1989 | Pitchenik | 364/46.02 |
| 4,802,218 | 1/1989 | Wright et al. | 380/23 |
| 4,809,185 | 2/1989 | Talmadge | 364/464.02 |
| 4,809,316 | 2/1989 | Namekawa | 379/58 |
| 4,829,466 | 5/1989 | Davis et al. | 364/900 |
| 4,831,555 | 5/1989 | Sansone et al. | 364/519 |
| 4,873,645 | 10/1989 | Hunter et al. | 364/479 |
| 5,111,197 | 5/1992 | Ichikawa | 340/825.44 |
| 5,151,694 | 9/1992 | Yamasaki | 340/825.44 |
| 5,161,109 | 11/1992 | Keating et al. | 364/464.02 |
| 5,192,947 | 3/1993 | Neustein | 340/825.44 |
| 5,202,912 | 4/1993 | Breeden et al. | 379/57 |
| 5,221,838 | 6/1993 | Gutman et al. | 235/379 |
| 5,276,728 | 1/1994 | Pagliaroli et al. | 379/58 |
| 5,293,319 | 3/1994 | DeSha et al. | 364/464.02 |
| 5,302,947 | 4/1994 | Fuller et al. | 340/825.34 |
| 5,325,431 | 6/1994 | Naruse | 380/16 |
| 5,367,464 | 11/1994 | Abumehdi et al. | 364/464.02 |
| 5,375,172 | 12/1994 | Chrosny | 380/51 |
| 5,384,886 | 1/1995 | Rourke | 364/464.02 |
| 5,497,140 | 3/1996 | Tuttle | 342/51 |
| 5,535,126 | 7/1996 | Mourgues | 364/464.02 |
| 5,566,166 | 10/1996 | Lee et al. | 370/282 |

FOREIGN PATENT DOCUMENTS

| | | | |
|---|---|---|---|
| 2227717 | 8/1990 | United Kingdom | G07B 17/00 |
| 2232929 | 1/1991 | United Kingdom | G07B 17/02 |

*Primary Examiner*—Douglas W. Olms
*Assistant Examiner*—Shick Hom
*Attorney, Agent, or Firm*—Charles R. Malandra, Jr.; David E. Pitchenik; Melvin J. Scolnick

[57] ABSTRACT

A value metering system embodying the present invention includes a storage component for storing a unique value metering system identification to enable identification of the value metering system from a plurality of other value metering systems. A communications component receives broadcast communications messages and processes the broadcast communications messages to determine if a received broadcast communications message is intended for the value metering system. A Controller component controls the operation of the value metering system. The controller component is coupled to the communications component and is responsive to specific received broadcast communications messages determined by the communications component to be intended for the value metering system.

17 Claims, 9 Drawing Sheets

(USER DEVICE)

(METER)

SECURE ACCOUNTING SYSTEM EMPLOYING RF COMMUNICATIONS FOR ENHANCED SECURITY AND FUNCTIONALITY

FIELD OF THE INVENTION

The present invention relates to secure accounting systems, and more particularly, to secure accounting systems employing communications for enhanced security and functionality.

BACKGROUND OF THE INVENTION

In mail preparation, a mailer prepares a mailpiece or a series of mailpieces for delivery to a recipient by a carrier service such as the United States Postal Service or other postal service or a private carrier delivery service. The carrier services, upon receiving or accepting a mailpiece or a series of mailpieces from a mailer, processes the mailpiece to prepare it for physical delivery to the recipient. Payment for the postal service or private carrier delivery service may be made by means of value metering devices such as postage meters. In systems of this type, the user prints an indicia, which may be digital token or other evidence of payment on the mailpiece or on a tape that is adhered to the mailpiece. The postage metering systems print and account for postage and other unit value printing such as parcel delivery service charges and tax stamps.

These postage meter systems involve both prepayment of postal charges by the mailer (prior to postage value imprinting) and post payment of postal charges by the mailer (subsequent to postage value imprinting). Postal charges or other terms referring to postal or postage meter or meter system as used herein should be understood to mean charges for either postal charges, tax charges, private carrier charges, tax service or private carrier service, as the case may be, and other value metering systems.

Since the meters store and print monetary value, the tracking and control over the functionality of value metering systems is very desirable and is required as part of various carrier service metering systems. This is a very costly and expensive process, involving significant administrative expenses and may involve the physical inspection of meters.

Some of the varied types of postage metering systems are shown, for example, in U.S. Pat. No. 3,978,457 for MICROCOMPUTERIZED ELECTRONIC POSTAGE METER SYSTEM, issued Aug. 31, 1976; U.S. Pat. No. 4,301,507 for ELECTRONIC POSTAGE METER HAVING PLURAL COMPUTING SYSTEMS, issued Nov. 17, 1981; and U.S., Pat. No. 4,579,054 for STAND ALONE ELECTRONIC MAILING MACHINE, issued Apr. 1, 1986. Moreover, the other types of metering systems have been developed which involve different printing systems such as those employing thermal printers, ink jet printers, mechanical printers and other types of printing technologies. Examples of some of these other types of electronic postage meters are described in U.S. Pat. No. 4,168,533 for MICROCOMPUTER MINIATURE POSTAGE METER, issued Sep. 18, 1979 and, U.S. Pat. No. 4,493,252 for POSTAGE PRINTING APPARATUS HAVING A MOVABLE PRINT HEAD AND A PRINT DRUM, issued Jan. 15, 1985. These systems enable the postage meter to print variable information, which may be alphanumeric and graphic type information.

Postage metering systems have also been developed which employ encrypted information on a mailpiece. The postage value for a mailpiece may be encrypted together with the other data to generate a digital token. A digital token is encrypted information that authenticates the information imprinted on a mailpiece such as postage value. Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,873,645 for SECURE POSTAGE DISPENSING SYSTEM issued Oct. 10, 1989 and, U.S. Pat. No. 4,725,718 for POSTAGE AND MAILING INFORMATION APPLYING SYSTEMS, issued Feb. 16, 1988. These systems, which may utilize a device termed a Postage Evidencing Device (PED), employ an encryption algorithm which is utilized to encrypt selected information to generate the digital token. The encryption of the information provides security to prevent altering of the printed information in a manner such that any change in a postal revenue block is detectable by appropriate verification procedures.

Encryption systems have also been proposed where accounting for postage payment occurs at a time subsequent to the printing of postage. Systems of this type are disclosed in U.S. Pat. No. 4,796,193 for POSTAGE PAYMENT SYSTEM FOR ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED, issued Jan. 3, 1989; U.S. Pat. No. 5,293,319 for POSTAGE METERING SYSTEM, issued Mar. 8, 1994; and, U.S. Pat. No. 5,375,172, for POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF POSTAGE, filed Jul. 7, 1986 by Wojciech M. Chrosny issued Dec. 20, 1994 and assigned to Pitney Bowes, Inc.

Other postage payment systems have been developed not employing encryption. Such a system is described in U.S. Pat. No. 5,391,562 for SYSTEM AND METHOD FOR PURCHASE AND APPLICATION OF POSTAGE USING PERSONAL COMPUTER, issued Feb. 21, 1995. This patent describes a system where end-user computers each include a modem for communicating with a computer at a postal authority. The system is operated under control of a postage meter program which causes communications with the postal authority to purchase postage and for updating the contents of the secure non-volatile memory. The postage printing program assigns a unique serial number to every printed envelope and label, where the unique serial number to every printed envelope and label, where the unique serial number includes a meter identifier unique to that end user. The postage printing program of the user directly controls the printer so as to prevent end users from printing more than one copy of any envelope or label with the same serial number. The patent suggests that by capturing and storing the serial numbers on all mailpieces, and then periodically processing the information, the postal service can detect fraudulent duplication of envelopes or labels. In this system, funds are accounted for by and at the mailer site. The mailer creates and issues the unique serial number which is not submitted to the postal service prior to mail entering the postal service mail processing stream. Moreover, no assistance is provided to enhance the deliverability of the mail beyond current existing systems.

SUMMARY OF THE INVENTION

It is an object of the present invention to provide a system which will enhance the security of the value metering systems.

It is another objective of the present invention to reduce the administrative costs and burden associated with various value metering systems.

It is yet another objective of the present invention to increase the functionality of various metering systems by providing increased flexibility in the operation of such systems.

It is a still further objective of the present invention to provide a system that allows the remote control of value metering systems even if their precise location is unknown.

A value metering system embodying the present invention includes means for storing a unique metering system identification to enable identification of the value metering system from a plurality of other value metering systems. Communications means are provided for receiving broadcast communication messages and processing the broadcast communications messages to determine if a received broadcast communications message is intended for the value metering system. Controller means control the operation of the value metering system. The controller means is coupled to the communications means and is responsive to specific received broadcast communications messages determined by the communications means to be intended for the value metering system.

BRIEF SUMMARY OF THE DRAWINGS

Reference is now made to the drawings wherein like reference numerals designate similar elements in the various figures and in which.

DETAILED DESCRIPTION OF THE PREFERRED EMBODIMENT

Figure 1:
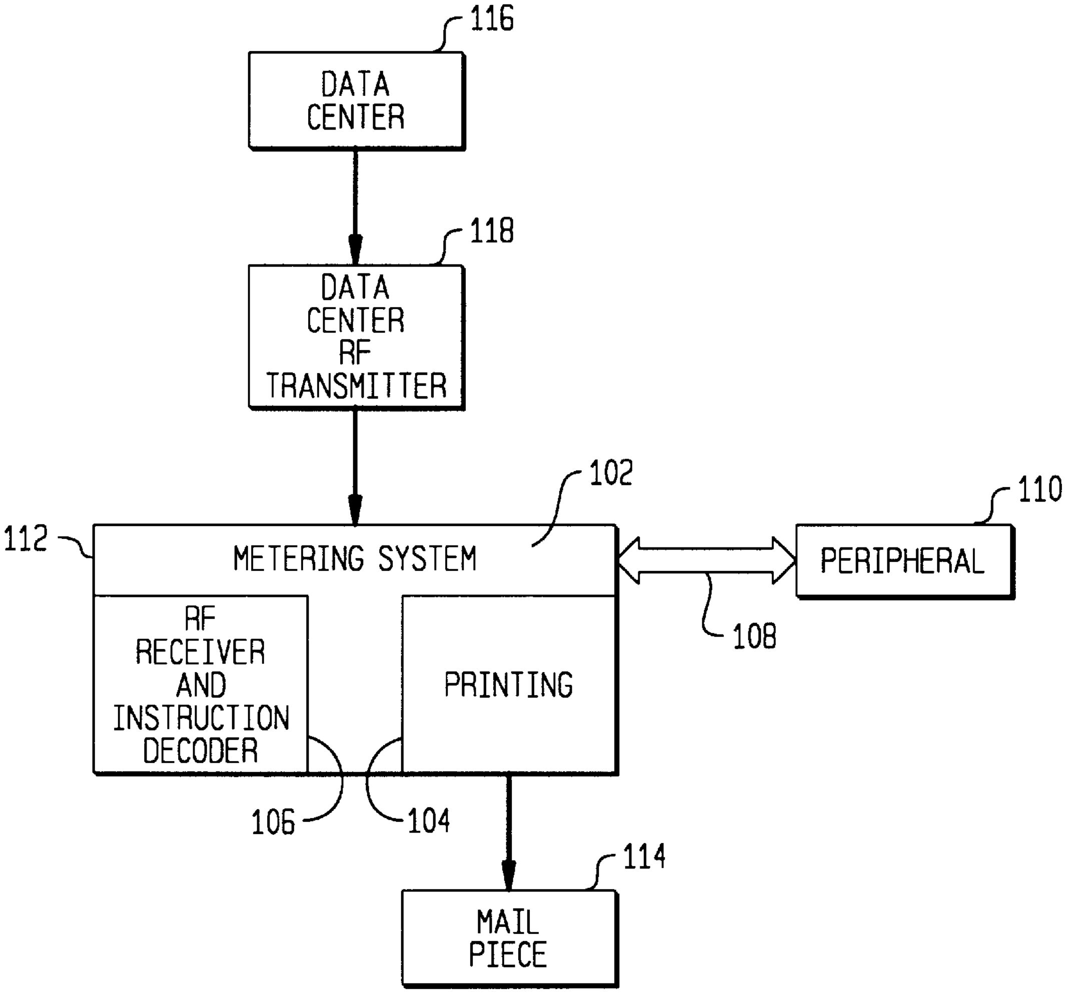
FIG. 1 is a block diagram of a secure accounting system with radio frequency (RF) communications providing enhanced security and functionality and embodying the present invention.

Reference is now made to FIG. 1. A metering system 102 such as an electronic postage meter includes a printing mechanism 104 and an RF receiver and instruction decoder 106. The secure metering system 102 may include a communication port 108 which, for example, may be connected to a peripheral device 110. The secure metering system 102 may be any type of secure metering system such as digital electronic postage meters, mechanical postage meters, electro-mechanical postage meters, mechanical tax meters, electro-mechanical tax meters, electronic tax meters, mechanical parcel registers, electronic parcel registers and electro-mechanical parcel registers. These devices may include, for example, card controlled metering systems such as those shown in U.S. Pat. No. 4,775,246 for SYSTEM FOR DETECTING UNACCOUNTED FOR PRINTING IN A VALUE PRINTING SYSTEM, issued Oct. 4, 1988, and in U.S. Pat. No. 4,802,218 for AUTOMATED TRANSACTION SYSTEM USING MICROPROCESSOR CARDS issued Jan. 31, 1989 or any other suitable metering system. It should be noted that the RF receiver and instruction decoder are mounted within the metering system secure housing 112. For those secure metering systems which include a printing mechanisms, the printing mechanism may be adapted to print on a mailpiece 114.

A remote data center 116 contains information relevant to the operation of the metering system 102. This information can be codes utilized to add funds to the metering system to allow continued operation after the metering system funds are depleted or to obtain and store information concerning the inspection and/or status of the metering system. Other types of relevant information concerning the metering device may also be stored at the data center 116. For example, information may be stored regarding the status of the rate charge data loaded into the metering system or an associated peripheral device which determines the appropriate postal and/or other rates to be utilized in processing mail and parcels. Further, for digital printing meters which imprint encrypted indicia such as that shown in the above-identified U.S. Pat. No. 4,775,246 or U.S. Pat. No. 4,831,555 for UNSECURED POSTAGE APPLYING SYSTEM, issued May 16, 1989 or pending U.S. patent application Ser. No. 08/414,563 filed Mar. 31, 1995, for CRYPTOGRAPHIC KEY MANAGEMENT AND VALIDATING SYSTEM, which is assigned to Pitney Bowes, Inc., the data center may have code related information concerning the metering device, as for example, the date by which a new code must be entered into the meter to allow continued operation of the metering device.

The data center 116 is connected to a data center RF transmitter 118. The RF receiver and instruction decoder in the metering system 102 may be a narrow band type receiver/decoder. Devices of this type are often designed to transmit over a wide geographical area information adapted to be received and processed by a single device having a specific address associated with the particular RF transmission. Examples of communications devices of this type are those communication devices commonly in use in RF "beeper/pager" systems. In these systems, a transmitter transmits a message which includes a particular address such as a telephone number of the specific beeper/pager to be contacted. Associated with the transmission is the specific information. The information may be alpha numerical information and include for example a name of an individual or a telephone number which the receiver is to process. The Motorola pager model 20001 is one example of a beeper/pager such types of device. By utilizing a secure RF receiver and instruction decoder within the metering system secure housing, added security and functionality is obtained as will be apparent from the detailed description set forth below.

Figure 2:
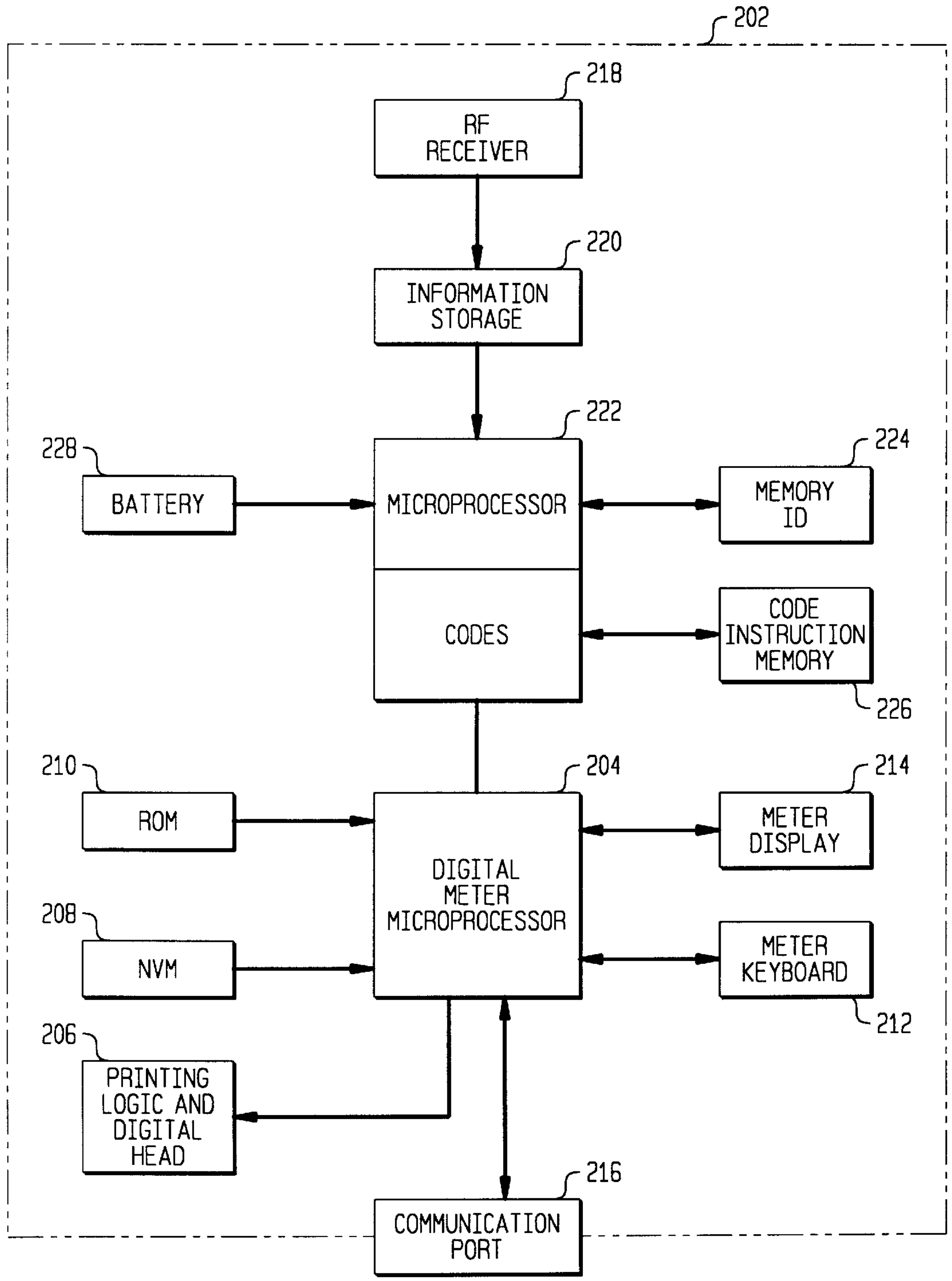
FIG. 2 is a block diagram of a digital electronic postage meter system employing RF communications and suitable for use in the system shown in FIG. 1.

Reference is now made to FIG. 2. A metering system 202 includes a digital meter microprocessor 204 which controls the operation of the metering system. Coupled to the digital meter microprocessor 204 is a printing logic and digital printhead system 206. The printhead may be a thermal printhead, a pin printer printhead or a ink jet printhead. Any of the digital printing technologies may be utilized, that is, technologies that allow the selective printing of various alpha numeric and symbol information.

A non-volatile memory 208 is connected to the digital meter microprocessor 204 and stores information relevant to the operation of the metering system 202. A read only memory 210 or other program store is connected to the digital meter microprocessor 204 to control the operation of the system. A meter keyboard 212 and a meter display 214 are also coupled to the digital meter microprocessor 204 for the input of information and the display of information for a user. A communications port 216 is provided. Communications port 216 may be a bidirectional communication port to allow information to flow into and out of the meter system 202

The meter system 202 also includes an RF receiver 218 which is connected to an information storage device memory 220 for storing information received by the RF receiver 218. The information store is connected to a second microprocessor 222 which in turn is connected to a memory 224 which contains information concerning the meter identification which enables operation of the data received by the RF receiver to effectuate operation of the meter system 202 if a comparison with the stored identification indicates that the reception is for the specific metering system involved. If this is the case the received information in memory 220, which maybe a microprocessor code, is applied to a code instruction memory 226 to provide further detailed operating instructions based on the received code. The code instruction memory flows information through the microprocessor 222 to the digital meter microprocessor 204 to cause the proper program stored in the read only memory 210 to be fetched for execution.

The system 202 is mounted within a secure housing such as the secure housing used with electronic and mechanical postage meters. These housings provide both physical security and electromagnetic and other forms of electrical and electronic security.

It should be specifically recognized that the other organizations of meter memory and microprocessor architecture can be employed in accordance with the present invention. A power supply internal to the metering system, not shown, provides operating power for the metering system 202. A battery 228 may be provided to provide power to the microprocessor 222 and the associated RF receiver portion of the secure metering system 202 such that the RF receiver is enabled to receive transmitted codes even though the metering system 202 is not energized by its normal operating source such as a 110 volt alternating power source.

Figure 3:
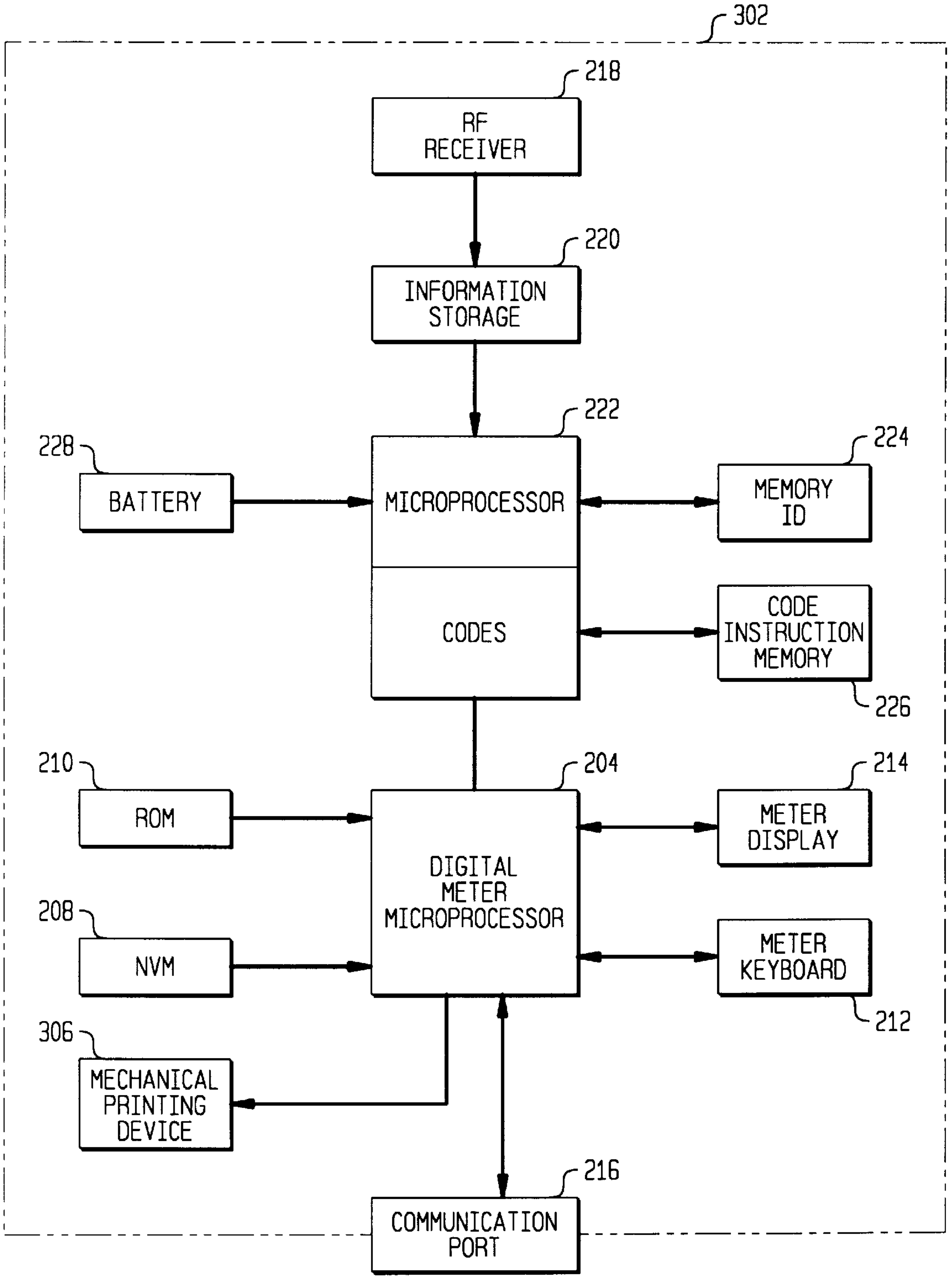
FIG. 3 is an electro-mechanical postage meter system similar to the digital electronic postage meter shown in FIG. 2 but employing an electro-mechanical printer rather than a digital printer.

Reference is now made to FIG. 3. The secure metering system 302 shown in FIG. 3 is similar to that shown in FIG. 2 except that the printing is by means of a mechanical printing device 306. A mechanical printing device of this type is disclosed in U.S. Pat. No. 4,287,825 for PRINTING CONTROL SYSTEM, issued Sep. 8, 1981 and includes mechanical printwheels mounted in a print drum which is enabled and disabled from printing operation by a shutter bar operated by a mailing machine external to the meter in conjunction with interposer devices operated internal to the meter system. Because the printing mechanism 306 does not allow the printing of any alpha numeric information but is confined to information previously included in the print drum such as the data on the print wheels and on the date wheels of the print drum, only certain information may be printed by systems of this type when enabled by the RF receiver through the reception of specific operational codes.

Figure 4:
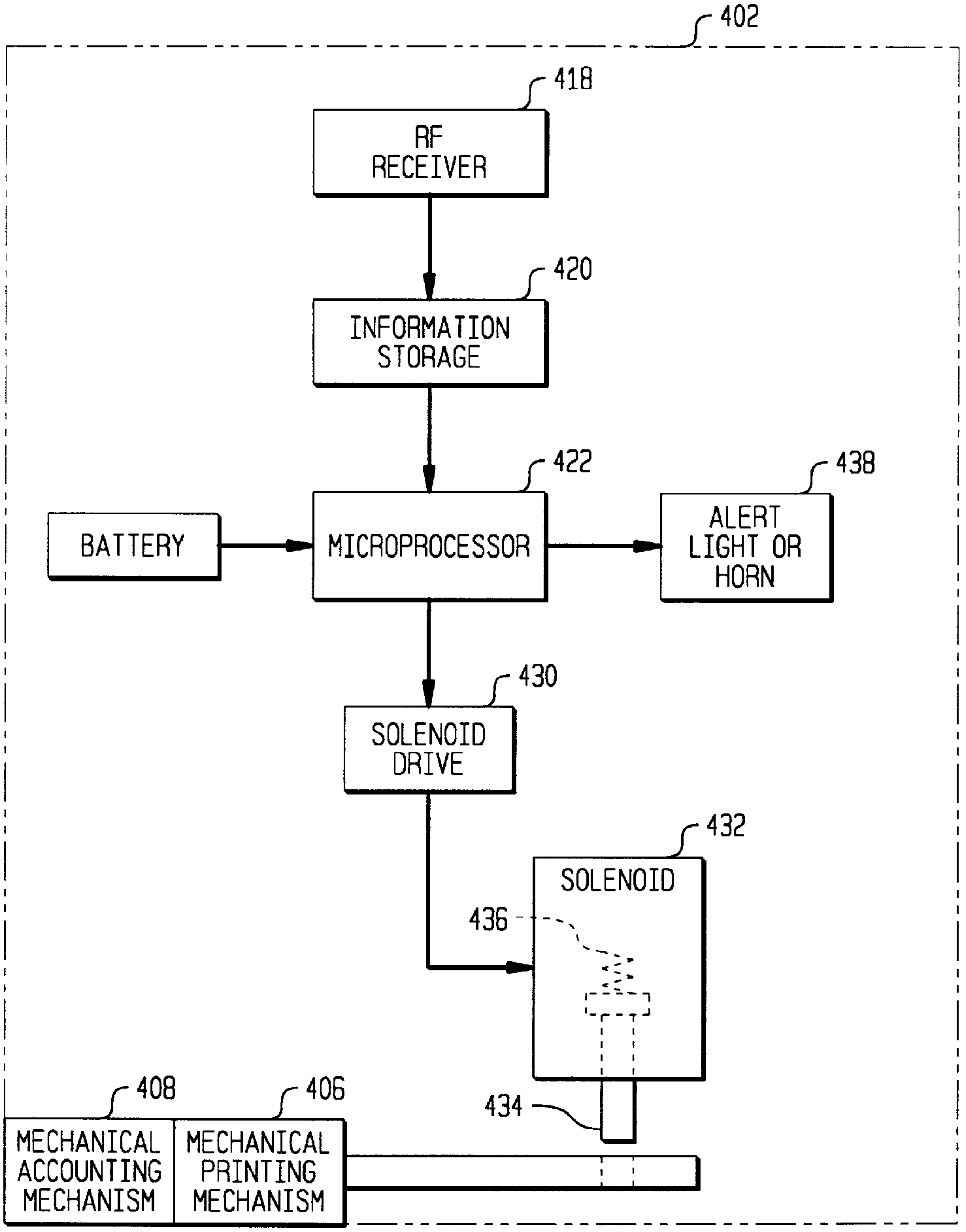
FIG. 4 is a block diagram of a mechanical meter system employing RF communications system to provide enhanced functionality and embodying a feature of the present invention.

Reference is now made to FIG. 4. The mechanical metering system 402 includes an RF system similar to that shown in FIGS. 2 and 3. The printing mechanism 406 is similar to the printing mechanism shown in FIG. 3. The printing is by means of a mechanical device and the mechanical printing mechanism 406 is connected, in a known manner, to a mechanical accounting mechanism 408. Mechanical accounting mechanisms accounts for postage printing of the printing mechanism 406. The RF microprocessor 422 is connected to a solenoid driver 430 which in turn is connected to control the operation of a solenoid 432. The solenoid 432 is positioned to have a reciprocating solenoid pin 434 shown in its retracted position. The solenoid pin is held in a position to allow the mechanical printing mechanism of the metering system 402 to operate in its normal fashion.

Upon receipt of a particular code by the RF receiver 418, which assuming appropriate meter identification determination, the code is processed by the microprocessor 422. This causes the solenoid driver to no longer holds the solenoid pin 434 in its retracted position. The force of a spring 436 within the solenoid causes the pin 434 to move to a position showed by dashed lines which locks the shutter bar of the meter from moving out of locking position with the mechanical printing mechanism 406. This causes the mechanical print mechanism 406 to be disabled from printing. The solenoid pin 434 is retractable upon receipt of another code by the RF receiver. Alternatively, it may be desirable for the metering system 402 to be taken out of service and require a service technician to physically enter the secured housing of the metering system 402 to re-enable the metering system for operation.

An alert light and/or horn 438 is connected to the microprocessor 422. The alert light and/or audible warning device such as a horn alerts the meter user to the fact that a code has been received and processed by the RF receiver. This notifies the user if the mechanical metering system 402 to take appropriate action. This action may be, for example, contacting the remote data center to provide information or the printing of predetermined information on a post card such to be sent to the data center such as a zero value imprint from the meter. This information can be utilized to determine the physical location of the meter and that the meter is in the possession of a licensed user.

If the required appropriate action is not taken, the data center may transmit a second code to cause the interposer of the solenoid pin 434 to be positioned to block printing of the mechanical printing mechanism 406. Several different alternatives are possible. For example, after the user is notified, the received code can cause immediate operation of the interposer solenoid on a next operation of the meter unless the required action is taken or, alternatively, a delayed action may be provided to enable the user time to contact the data center or mail the predetermined imprint. Moreover, it should be further noted that the alert light or horn can be caused to operate in a different manner to provide different information to the user. For example the alert light may blink quickly or slowly or have a steady illumination, each having different significance depending on the nature of the system involved. Similarly, different type hour signals may also be provided.

Figure 5:
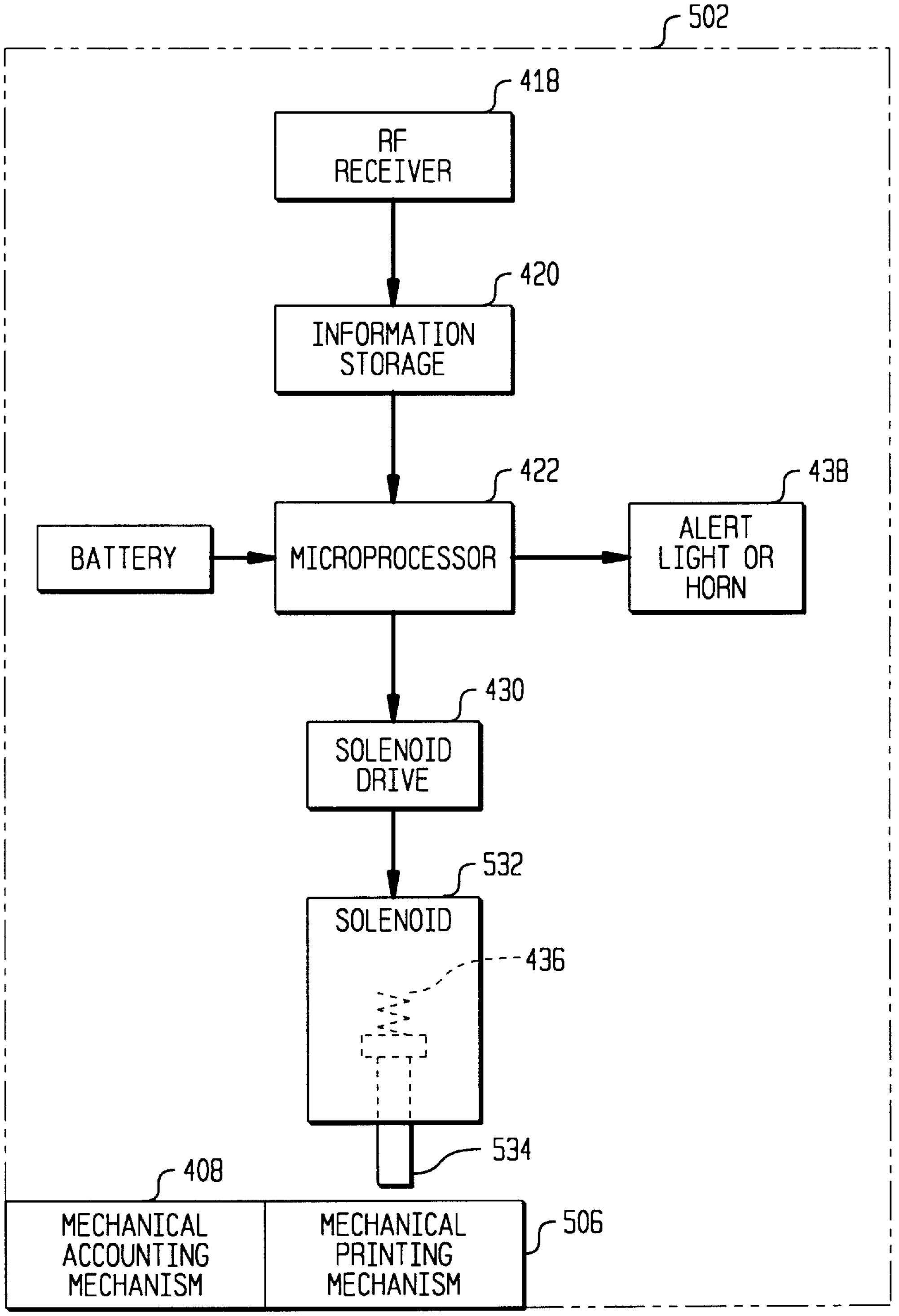
FIG. 5 is an alternate embodiment of the mechanical metering system shown in FIG. 4.

Reference is now made to FIG. 5. Mechanical metering system 502 is similar in structure and operation to that shown in FIG. 4; however, the solenoid device is repositioned such that the solenoid pin 534 moves into direct blocking engagement with the meter mechanical printing mechanism 506. It should be recognized that depending upon the structure and nature of the mechanical printing mechanism, the solenoid 532 or other similar device, can be employed in any of a number of arrangements which can selectively disable the mechanical printing mechanism from operating.

Figure 6:
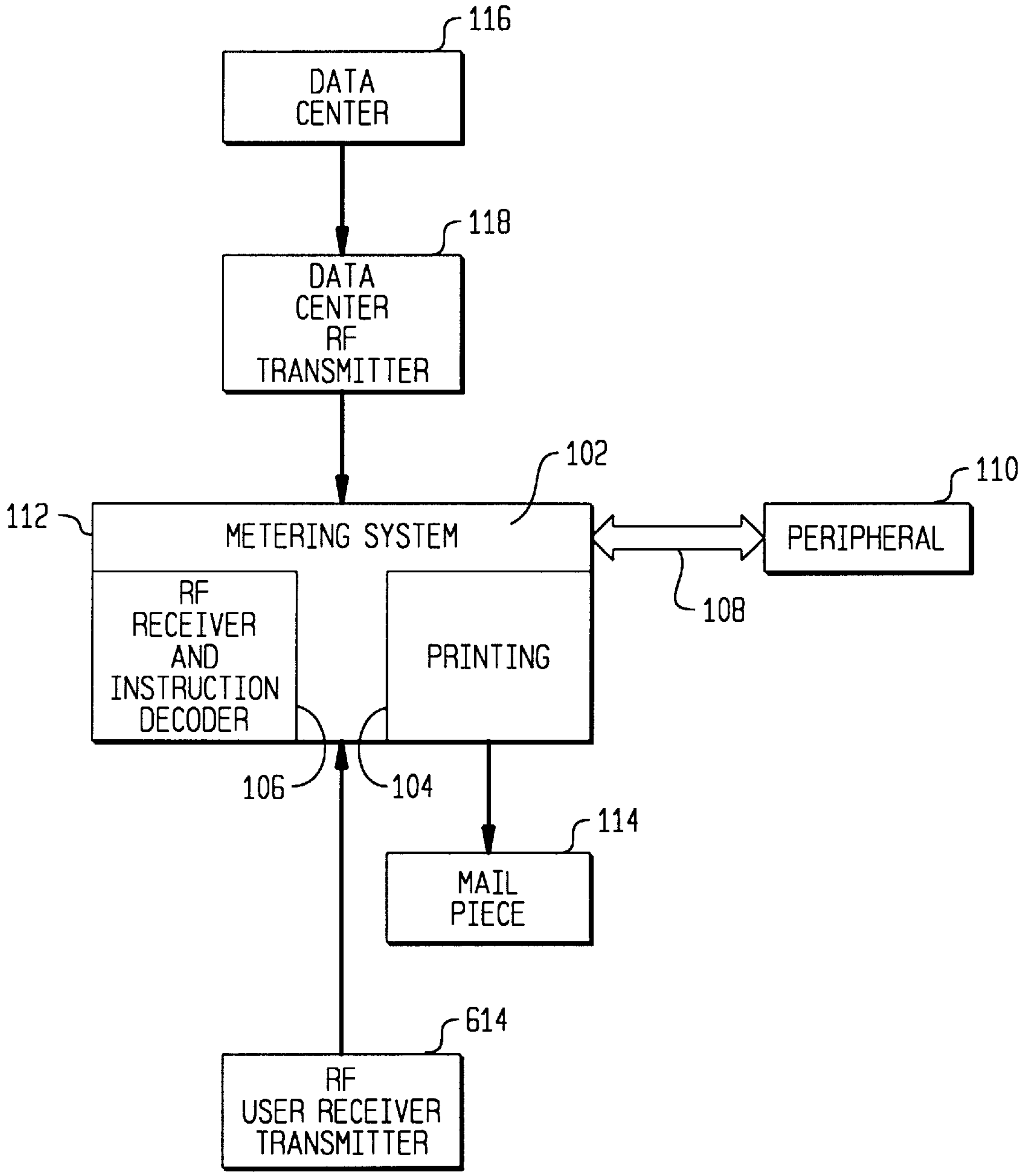
FIG. 6 is a secure accounting system similar to that shown in FIG. 1 employing a subsystem providing an RF receiver/transmitter capability such that the metering system has yet further functionality and security.

Reference is now made to FIG. 6. A secure accounting system similar to that shown in FIG. 1 includes user RF receiver/transmitter 614. The user RF receiver/transmitter 614 is adapted to receive RF transmissions from the data center RF transmitter 118. Upon receiving such transmission, the user of the metering system 102 is alerted either by a display or an audible sound of the status of the transmission. The user selectively enables a further transmission. This transmission being the transmission from the receiver/transmitter 614. The transmission from the user RF receiver/transmitter 614 is adapted to transmit to the RF receiver and instruction decoder 106 of the metering system 102. This enables further processing of the received data by the meter 102. In this manner the user is provided with selective control over processing with occurs within the secure housing of the metering system 102. Thus, for example, the user can selectively enable the updating of rate charts for metering system if desired.

Figures 7, 7A:
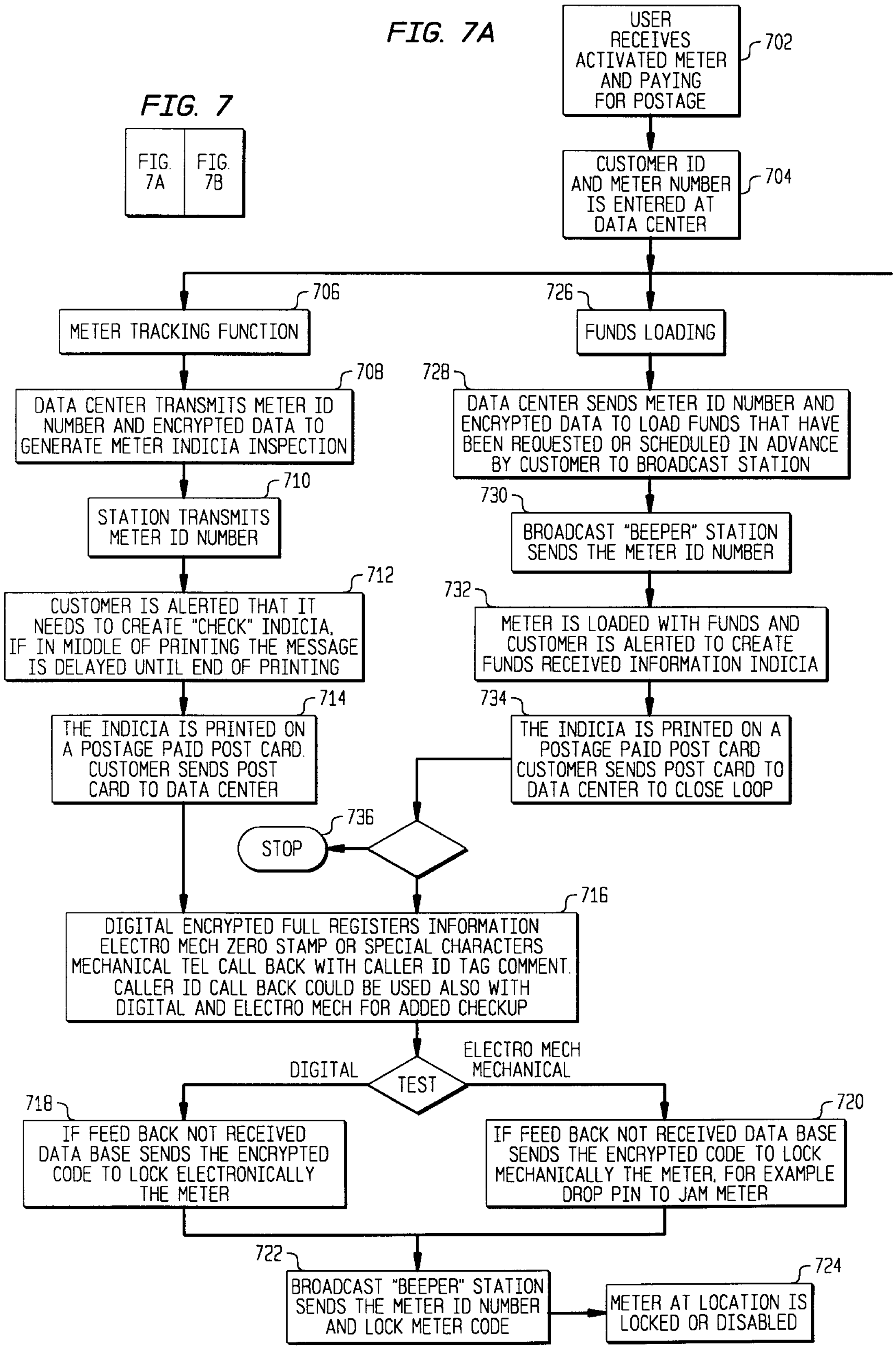
FIG. 7 is a flow chart of the operation of the system secure accounting system showing the interaction of digital, electromechanical and mechanical meter systems with the secure accounting system data center and also showing the interaction with peripheral devices for the digital and electro-mechanical meter systems, shown in FIGS. 1 through 6.
Figure 7B:
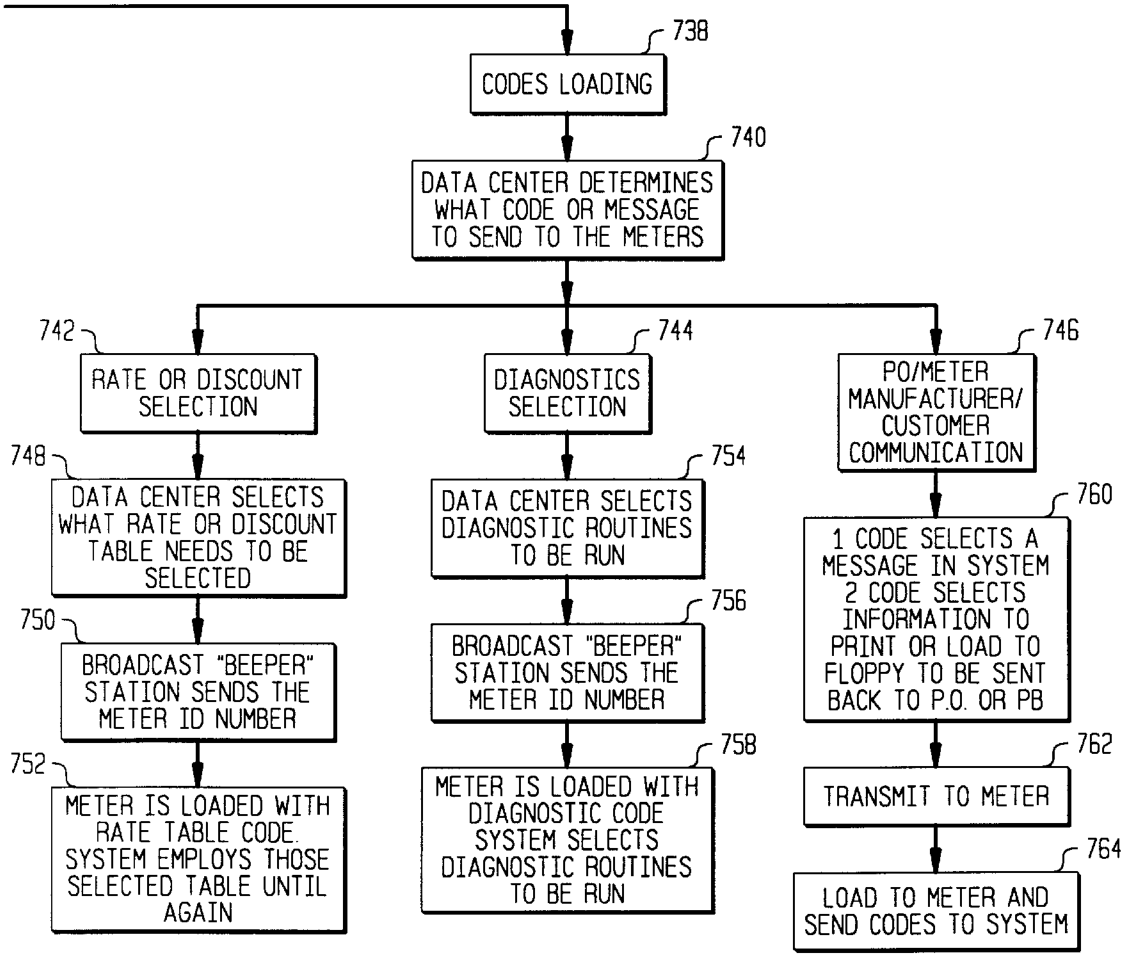

Reference is now made to FIG. 7. A customer receives an activated meter 702. For those systems which require payment in advance for postage, as opposed to current account systems, the user pays for postage to be stored in the metering system. The user identification and meter serial number or other identification is entered at the data center at 704. At this point the meter is operational and any of the number of different functions may be implemented in accordance with the present invention.

The meter tracking function which commences at 706. The data center transmits a meter identification number and, if desired, encrypted data to generate a meter inspection indicia at 708. The meter inspection indicia is an indicia printed by the meter which provides inspection information concerning the operation and functionality of the meter. This information is communicated to the data center RF transmitter and the broadcast station transmits (broadcasts) the meter number and encrypted data at 710. A user is alerted that a need exists to create a check indicia or print the check indicia by the meter at 712. If the meter is in the middle of printing, the message display is delayed until the end of the printing operation or series of printing operations then in progress. The indicia is printed by the user, as for example, in a postage prepaid postcard, and the user sends the postcard to the data center at 714.

If the meter is a digital meter, the postcard may contain full register information and other encrypted information and/or plaintext information to fully provide the status of the meter as to its operation and functionality. If the meter is electro-mechanical, a zero stamped imprint or an imprint with special characters may be initiated and imprinted. On the other hand, if the meter is mechanical, the user may be required to contact the data center and/or set the meter to print a particular value imprint which is thereafter sent to the data center to demonstrate physical possession of the meter and thus verify the meters location.

Based on the type of system and the test, if the meter is a digital meter system and the necessary feed back is not received by the data center, the data center may transmit another code to electronically lock the digital metering system at 118. On the other hand if the meter is an electro-mechanical or mechanical meter and feedback is not received, the data center may transmit a further code to mechanically lock the meter printing mechanism as described in connection with FIGS. 3, 4 and 5. The encrypted code at 718 or the encrypted code at 720 is transmitted by the data center RF transmitter at 722 and the metering system is locked or disabled at 724 in the manner previously described.

In the funds loading function at 726, the data center at 728 sends to the broadcast station the meter identification number and encrypted data to load funds that have been requested or scheduled in advance by the user. The RF transmitter broadcasts the meter identification number and encrypted data at 730. The received transmission causes the meter to be loaded with funds and the user is alerted to create a funds received information indicia at 732. The funds received indicia is imprinted by the meter for example on a postage prepaid postcard and the user sends the postcard to the data center at 734. This closes the loop so that the data has confirmation that the funds have been loaded into the meter. If the postcard is received, the process is stopped at this point at 736. If however, the postcard or other communication is not received, the process continues as previously described in connection with process step 716, 718, 720, 722 and 724.

In the codes loading function at 738, the data center determines what codes or messages are to be sent to the meters at 740. The codes functionality rate or discount selection at 742, diagnostic selection at 744 and post office or meter manufacturer customer communication at 746.

For the rate or discount function at 742, the data center selects what rate or discount table need to be selected 748. The data center RF transmitter broadcasts the meter number identification and selected rate code 750. The meter is loaded with the rate table code and the systems employs those selected rate tables at 752 until a new rate table code is loaded into the meter. At 752 feedback is required to confirm the proper loading of the rate table, the process used in connection with the meter tracking function where a predetermined imprint is caused to be made and sent back to the data center can be utilized.

In connection with the diagnosis selection function at 744 the data center selects the diagnostic routines to be run at 754. The data center RF transmitter broadcasts the meter identification and the code for the particular diagnostic routine at 756. The meter is loaded with the transmitted diagnostic code and the system selects the specified diagnostic routine to be run at 758. As in the case with the rate selection function, if desired, an imprinted pre-addressed postcard may be caused to be imprinted to close the loop and provide feedback. For those metering systems employing various memory system such as floppy disks or other memory device where large quantities of information are required, a floppy disk or other inventory device may be loaded with information and sent to the data center. This can be done either through a floppy disk which may be part of the meter system or a floppy disk which is part of a peripheral system connected to the meter system whereby the meter system downloads information to the peripheral system which is then recorded on the floppy disk of the peripheral system.

For the Post Office and/or manufacturer/Customer Communication function at 746, the data center selects a code message at 760 suitable for use in the system which is thereafter transmitted at 762. The code may be associated with seed numbers for encryption or other data relevant to the operation of the system. If desired, the successful or unsuccessful loading of the code into the meter may be provided to close the loop and providing feedback to the data center in the manner previously described either through a preprinted postcard or floppy disk or by other means such as the user contacting the data center to provide information from the meter system display. The code message at 760 is transmitted to the meter at 762 and loaded into the meter and the system at 764. The meter system responds to the loaded codes to either change an encrypted seed number and may further download the information as previously noted to a floppy disk or other portable media such as a smart card as previously noted for use in peripheral systems.

It should be specifically noted that the system described in FIG. 7 is a one way communication system. The functionality of the feedback can be implemented by way of a two way RF communication system. In such a case the RF receiver associated with the meters would constitute a RF receiver/transmitter such as the device 614 of FIG. 6. Nevertheless, by requiring the feedback to be by way of imprinted indicia, added security is provided to the system since the physical imprint and physical operation of the system are communicated back to the data center where a further inspection can be implemented if the imprinted or communicated data are not as required.

Figure 8:
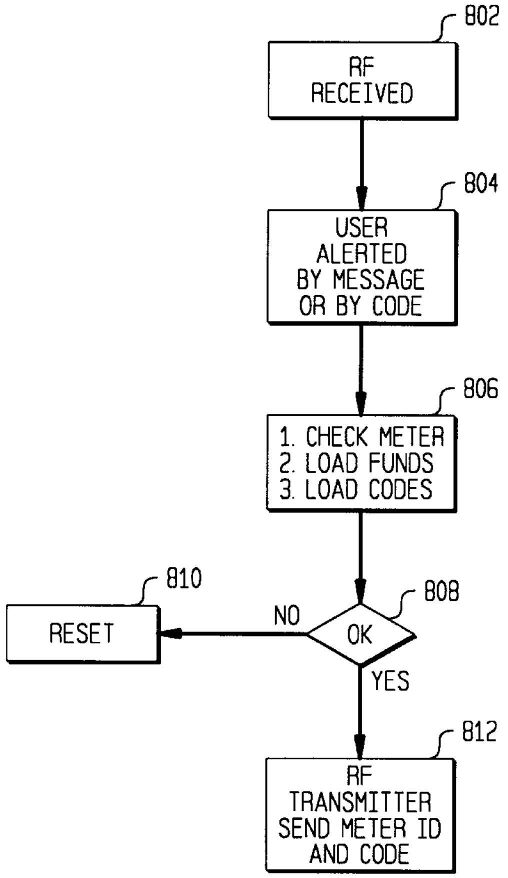
FIG. 8 is a flow chart of the operation of the user device shown in FIG. 6; and, FIG. 9 is a flow chart of the operation of aspects of the secure accounting system shown in FIG. 6.

Reference is now made to FIG. 8. The RF receiver/transmitter 614 shown in FIG. 6 receives an RF communication at 802. At 804 the user is alerted by a message or a code in device 614 of the transmission by the data center of a particular code for the metering system 602. At 806 the user determines the nature of the code received such as check the meter, load funds into the meter, or load codes into the meter. The user determines at 808 whether the function is to be implemented. If it is not to be implemented, the user terminates the procedure at 810 by reset. The reset may reset the device 614 and transmit both to the meter and the data center that the operation is not to proceed. Alternatively, if the user decides to implement the function, the device 614 transmits at 812 the meter identification and associated code to enable the meter to proceed with the function.

Figure 9:
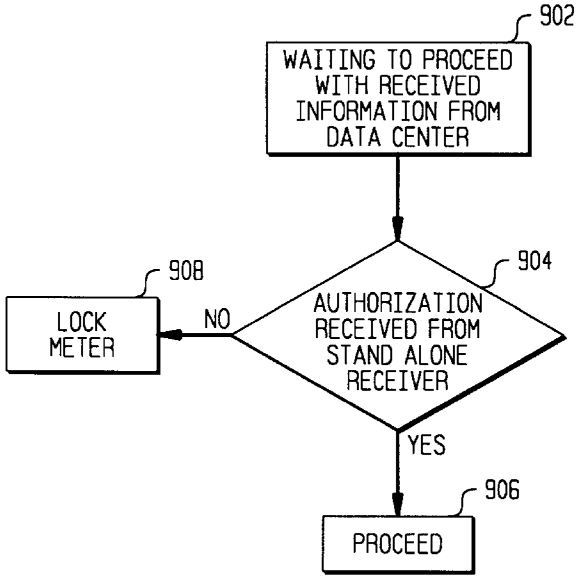

Reference is now made to FIG. 9. The meter system 102 having previously received the communication from the data center RF transmission at 902, is in a wait state waiting to proceed with the received information from the data center. The transmission from the device 614 is processed at 904. If the processed information from the device 614 is to proceed, the code from the data center is enabled to cause the desired functionality and the meter to proceed at 906. If on the other hand, the reset signal is received from the device 610, the meter is locked at 908 or the functionality is not enabled depending upon the circumstance. The functionality of the particular operation to be proceeded with at 906 is more fully described in the above description of FIG. 7.

While the present invention has been disclosed and described with reference to the disclosed embodiments thereof, it will be apparent, as noted above, that variations and modifications may be made therein. As an example, different forms of wide band communications may be employed. It is, thus, intended in the following claims to cover each variation and modification that falls within the true spirit and scope of the present invention.

What is claimed is:

1. A value metering system comprising:

means for storing a unique value metering system identification to enable identification of said value metering system from a plurality of other value metering systems;

communications means for receiving broadcast communications messages and processing said broadcast communications messages to determine if said broadcast communications message received is intended for said value metering system;

controller means for controlling the operation of said value metering system, said controller means coupled to said communications means and responsive to specific received broadcast communications message determined by said communications means to be intended for said value metering system; and, including value printing means coupled to said controller means, said controller means being operable in response to a first specific received broadcast communications message determined by said communications means to be intended for said value metering system to disable said value printing means from printing.

2. The value metering system as defined in claim 1 wherein said controller means is operable in response to a second specific received broadcast so communications message determined by said communications means to be intended for said value metering system to enable said value printing means for printing.

3. The value metering system as defined in claim 1 including transmitter means for transmitting broadcast communications messages specific to said value metering systems.

4. The value metering system as defined in claim 3 wherein said broadcast communication messages and said broadcast communication messages are transmitted and received as radio frequency signals.

5. The value metering system as defined in claim 1 wherein said controller means controls said value printing means to print determined information in response to a third specific received broadcast communications message determined by said communications means to be intended for said value metering system.

6. The value metering system as defined in claim 1 including value printing means coupled to said controller means, said value printing means being adapted to be controlled by said controller means and accounting means coupled to said value printer means for accounting for value printing by said value printing means.

7. The value metering system as defined in claim 6 including a secure housing enclosing said means for storing said controller means and said accounting means.

8. The value metering system as defined in claim 1 including a second communications means for receiving broadcast communications messages and processing said broadcast communications messages to determine if said broadcast communications message received is intended for said value metering system, said second communications means providing information to a user as to broadcast communications message received is intended for said value metering system.

9. The value metering system as defined in claim 8 wherein said second communications means includes transmitter means operable by a user of said value metering system for transmitting communications messages specific to said value metering system.

10. The value metering system as defined in claim 1 including power supply means for providing operation power for said value metering system and battery means operable coupled to said communications means to provide operating power to said communications means so that said communications means is enabled for receiving broadcast communications messages and processing said broadcast communications messages when said means for providing operating power is not providing power to said value metering system.

11. A value metering system comprising:

means for storing a unique value metering system identification to enable identification of said value metering system from a plurality of other value metering systems;

communications means for receiving broadcast communications messages and processing said broadcast communications messages to determine if said broadcast communications message received is intended for said value metering system; and, controller means for controlling the operation of said value metering system, said controller means coupled to said communications means and responsive to specific received broadcast communications message determined by said communications means to be intended for said value metering system, wherein said broadcast communications messages include specific messages relating to value metering tracking.

12. The value metering system is defined in claim 1 wherein said value metering system includes value printing means coupled to said controller means and adapted to be controlled by said controller means, and accounting means coupled to said value printer means for storing funds and for accounting for value printed by said value printer means, and said broadcast communications messages include specific messages relating to loading funds into said accounting means.

13. A value metering system comprising:

means for storing a unique value metering system identification to enable identification of said value metering system from a plurality of other value metering systems;

communications means for receiving broadcast communications messages and processing said broadcast communications messages to determine if said broadcast communications message received is intended for said value metering system;

controller means for controlling the operation of said value metering system, said controller means coupled to said communications means and responsive to specific received broadcast communications message determined by said communications means to be intended for said value metering system; and, wherein said broadcast communications messages include specific messages relating to codes loading.

14. The value metering system as defined in claim 13 wherein said codes includes a code relating to value meter system diagnostic selection.

15. The value metering system as defined in claim 13 wherein said codes include postal rate selection information.

16. The value metering system as defined in claim 13 wherein said codes includes postal rate value update information.

17. The value metering system as defined in claim 13 wherein said codes include postal rate change information.

* * * * *